(12) United States Patent
Marinoni et al.

(10) Patent No.: US 10,655,712 B2
(45) Date of Patent: May 19, 2020

(54) LEVER MECHANISM FOR CONVERTING A MOTION FROM LINEAR TO ROTARY

(71) Applicant: AIR TORQUE S.P.A., Costa di Mezzate (IT)

(72) Inventors: Antonio Marinoni, Grumello del Monte (IT); Santo Rota, Albano Sant'alessandro (IT); Ignazio Paris, Grumello del Monte (IT)

(73) Assignee: AIR TORQUE S.P.A., Costa di Mezzate (IT)

( * ) Notice: Subject to any disclaimer, the term of this patent is extended or adjusted under 35 U.S.C. 154(b) by 333 days.

(21) Appl. No.: 15/315,271

(22) PCT Filed: May 29, 2015

(86) PCT No.: PCT/IB2015/054069
§ 371 (c)(1),
(2) Date: Nov. 30, 2016

(87) PCT Pub. No.: WO2015/181794
PCT Pub. Date: Dec. 3, 2015

(65) Prior Publication Data
US 2017/0241522 A1 Aug. 24, 2017

(30) Foreign Application Priority Data

May 30, 2014 (IT) .............................. MI2014A1002

(51) Int. Cl.
*F16H 21/44* (2006.01)
*F16H 57/04* (2010.01)
(Continued)

(52) U.S. Cl.
CPC ............. *F16H 21/44* (2013.01); *F15B 15/06* (2013.01); *F15B 15/066* (2013.01); *F16C 17/04* (2013.01);
(Continued)

(58) Field of Classification Search
CPC ......... F16C 11/02; F15B 15/066; F15B 15/06
See application file for complete search history.

(56) References Cited

U.S. PATENT DOCUMENTS

| 4,398,862 A | 8/1983 | Schroeder |
| 5,626,054 A * | 5/1997 | Rembert ................. F15B 15/06 403/114 |
| 2004/0168845 A1* | 9/2004 | Bellich ................. F16H 57/021 180/247 |

FOREIGN PATENT DOCUMENTS

| DE | 2134489 A1 | 6/1972 |
| EP | 1394419 A2 | 3/2004 |
| WO | 2009095800 A | 8/2009 |

OTHER PUBLICATIONS

International Search Report dated Oct. 5, 2015 re: Application No. PCT/IB2015/054069; pp. 1-3; citing: DE 21 34 489 A1, US 4 398 862 A, WO 209/095800 A1, EP 1 394 419 A2.

* cited by examiner

*Primary Examiner* — William Kelleher
*Assistant Examiner* — Gregory T Prather
(74) *Attorney, Agent, or Firm* — Cantor Colburn LLP

(57) ABSTRACT

A lever mechanism for converting a motion from linear to rotary includes a guiding bar, a slider which slides along the guiding bar, and a lever. The lever includes a cylindrical element and a pair of slot links which are fixed frontally on the cylindrical element and between which the slider is arranged. The slider includes at least two bushes for supporting a pivot which is adapted to act on the slot links. The bushes are mutually separated by a space to accommodate a reserve of lubricant.

10 Claims, 5 Drawing Sheets

(51) Int. Cl.
    *F16K 31/528*     (2006.01)
    *F16H 25/18*     (2006.01)
    *F15B 15/06*     (2006.01)
    *F16C 17/04*     (2006.01)
    *F16C 33/04*     (2006.01)
    *F16H 25/20*     (2006.01)
    *F16H 21/36*     (2006.01)

(52) U.S. Cl.
    CPC .............. *F16C 33/04* (2013.01); *F16H 25/18* (2013.01); *F16H 57/0471* (2013.01); *F16K 31/528* (2013.01); *F16C 2360/22* (2013.01); *F16H 21/36* (2013.01); *F16H 57/0464* (2013.01); *F16H 2025/2043* (2013.01)

LEVER MECHANISM FOR CONVERTING A MOTION FROM LINEAR TO ROTARY

CROSS-REFERENCE TO RELATED APPLICATIONS

This application is related to and claims the benefit of Italian Patent Application No. MI2014A001002, filed on May 30, 2014, the contents of which are herein incorporated by reference in their entirety.

TECHNICAL FIELD

The disclosure relates to a lever mechanism for converting a motion from linear to rotary. The lever mechanism described herein is particularly, although not exclusively, useful and practical for converting a motion of the alternating linear type, for example, generated by a pneumatic cylinder/piston assembly, to a motion of the alternating rotary type which follows the direction defined by a circular arc.

BACKGROUND

Currently several different types are known of mechanisms in general, and of lever mechanisms in particular, i.e. several types of mechanisms, constituted by an assembly of mechanical elements, which are adapted to transmit motion in a complex machine, in which certain elements describe particular curves and can convert motion of one type to motion of another type.

Such mechanisms are nowadays used in uncountable machines and mechanical devices: a typical example of a mechanism is the crankshaft mechanism, which can convert alternating linear motion to circular motion.

Conventional lever mechanisms are not devoid of drawbacks, among which is the fact that some of the mechanical elements that constitute them are subject to high wear from sliding, which derives from the friction that arises between the surfaces of such mechanical elements during operation and the movement of the kinematic mechanism.

Another drawback of such conventional lever mechanisms consists in that they do not allow an adequate and lasting lubrication of the mechanical elements that comprise them, consequently making it necessary to carry out frequent maintenance operations.

A further drawback of such conventional lever mechanisms consists in that the resistance to movement, which is produced by the friction between the surfaces of the mechanical elements that comprise them, makes a greater force necessary in order to perform such movement.

SUMMARY

The aim of the present disclosure is to overcome the limitations of the known art described above, by devising a lever mechanism for converting a motion from linear to rotary which makes it possible to obtain similar or better effects with respect to those that can be obtained with conventional lever mechanisms, reducing the friction between the surfaces and the wear from sliding which usually afflict the mechanical elements of the lever mechanism and, as a consequence, lengthening the useful life of the lever mechanism.

Within this aim, the present disclosure devises a lever mechanism that makes it possible to internally store and retain a sufficient reserve of lubricant to ensure an adequate and lasting lubrication of the mechanical elements, as a consequence reducing the frequency of maintenance operations.

The present disclosure also devises a lever mechanism that facilitates the substitution or topping-up of the lubricant.

The present disclosure further devises a lever mechanism that offers less resistance to movement and which can thus also be actuated by way of applying less force, thus making it possible, if desired, to use drive means which are less powerful and which consume less energy.

The present disclosure provides a lever mechanism that is highly reliable, easily and practically implemented and low cost.

This aim and these advantages which will become better apparent hereinafter are achieved by providing a lever mechanism for converting a motion from linear to rotary, comprising a guiding bar, a slider which slides along said guiding bar, and a lever, said lever comprising a cylindrical element and a pair of slot links which are fixed frontally on said cylindrical element and between which said slider is arranged, wherein said slider comprises at least two bushes for supporting a pivot which is adapted to act on said slot links, said at least two bushes being mutually separated by a space which is adapted to accommodate a reserve of lubricant.

BRIEF DESCRIPTION OF THE DRAWINGS

Further characteristics and advantages of the disclosure will become better apparent from the description of a preferred, but not exclusive, embodiment of the lever mechanism according to the disclosure, which is illustrated by way of non-limiting example in the accompanying drawings wherein.

DETAILED DESCRIPTION OF THE DRAWINGS

Figure 1A:
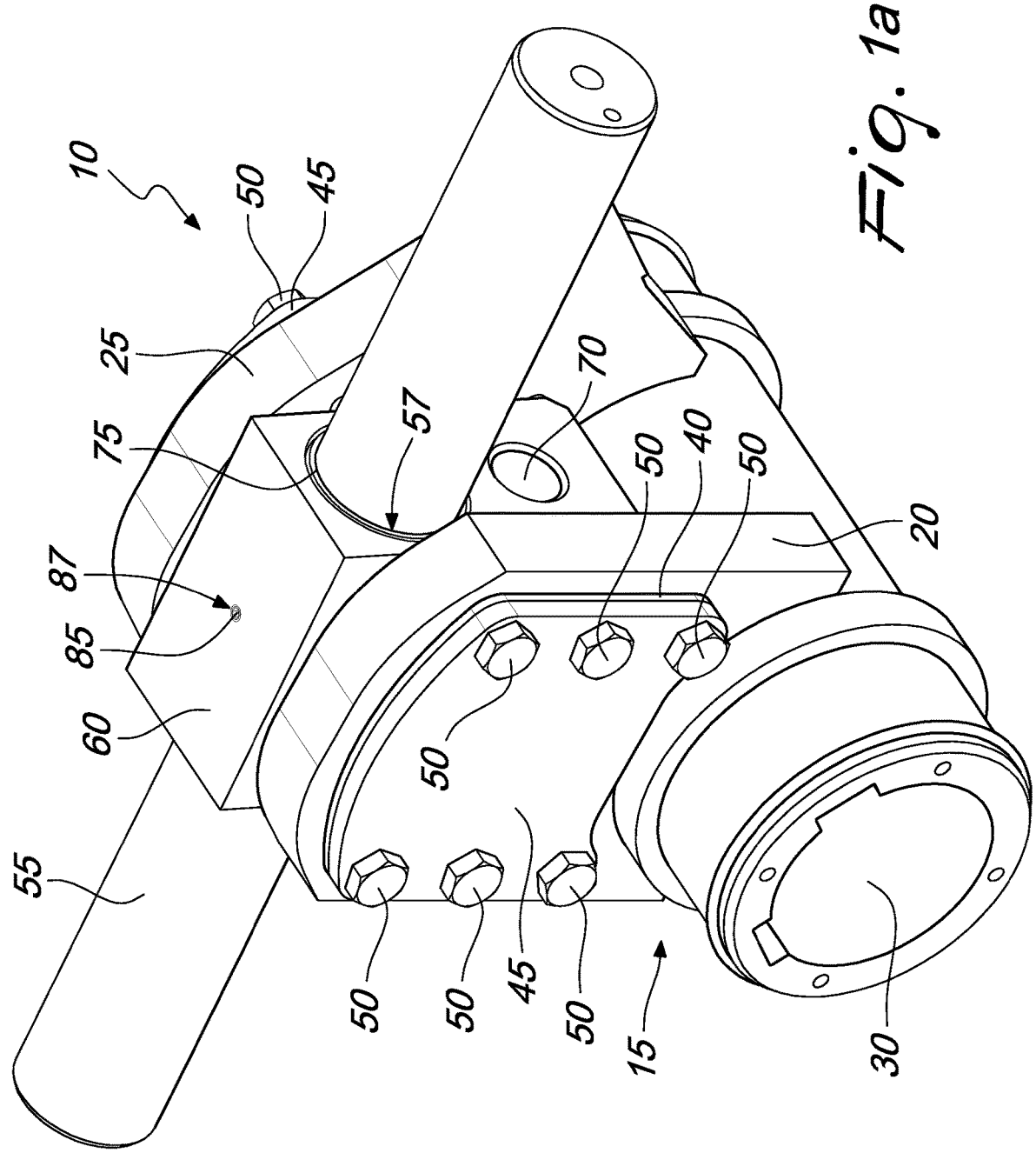
FIGS. 1a and 1b are perspective views of an embodiment of a lever mechanism according to the present disclosure, respectively in the presence and in the absence of the cover of a slot link.
Figure 1B:
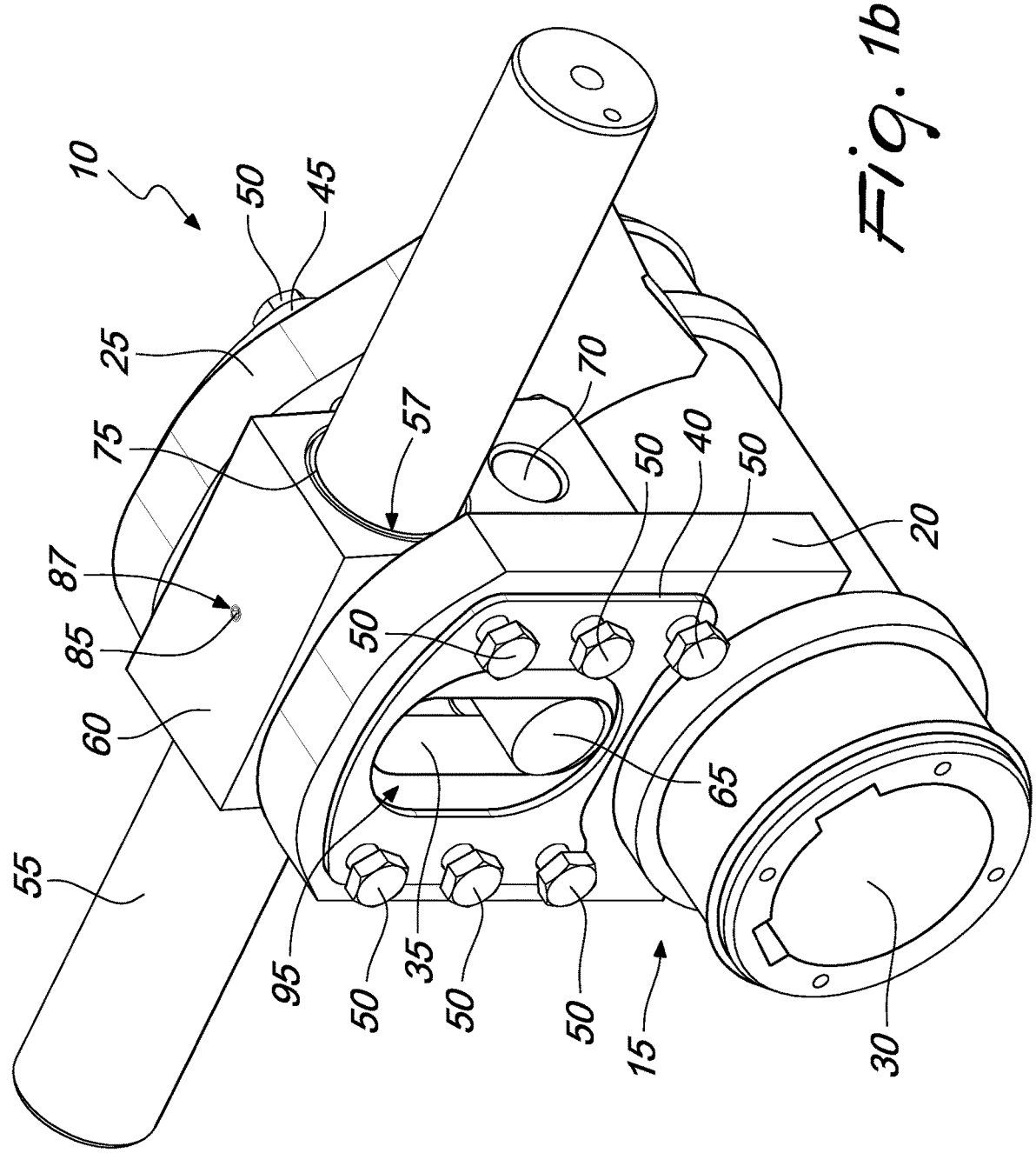
Figure 2:
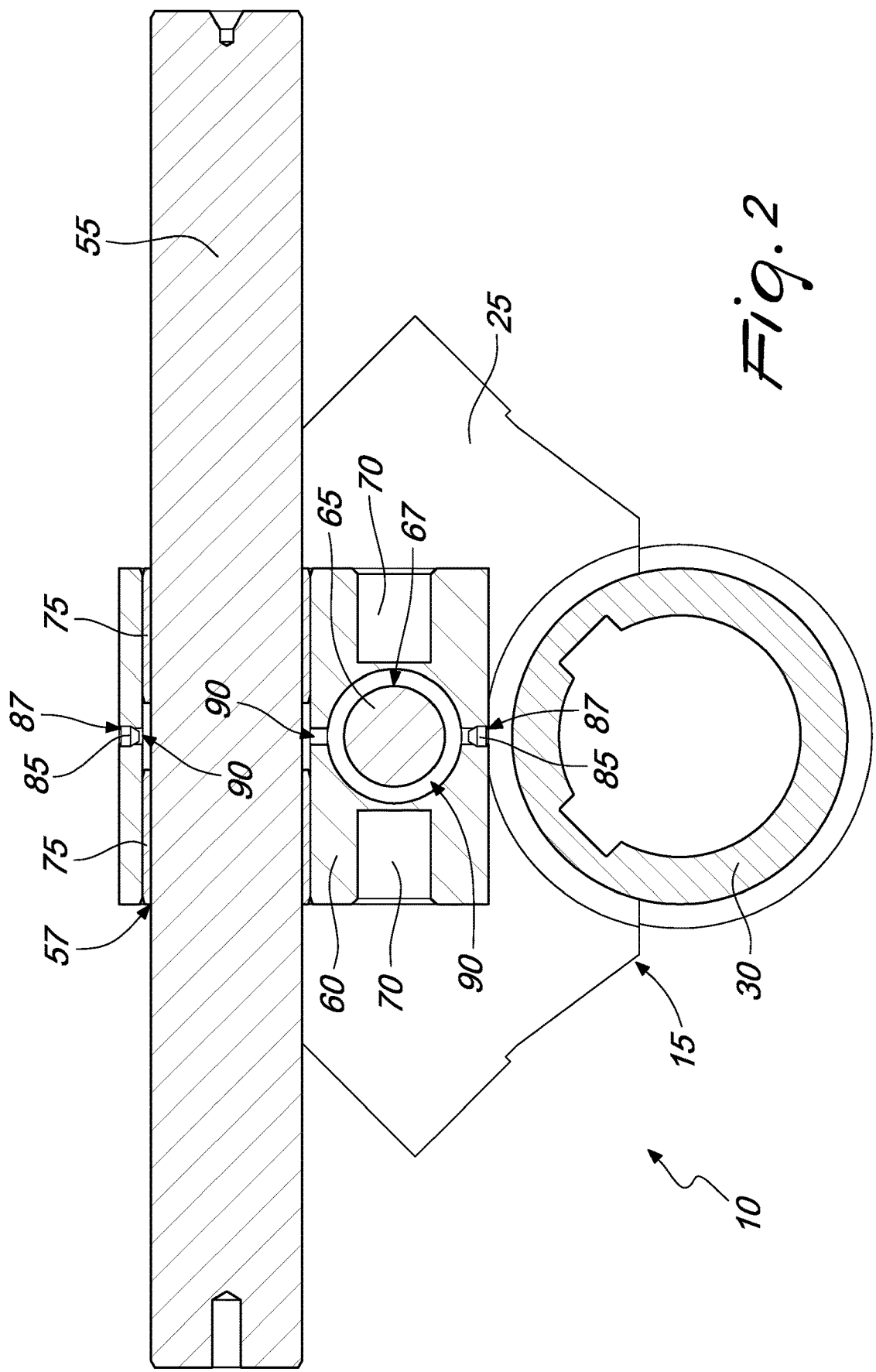
FIG. 2 is a cross-sectional side view of an embodiment of the lever mechanism according to the present disclosure.
Figure 3:
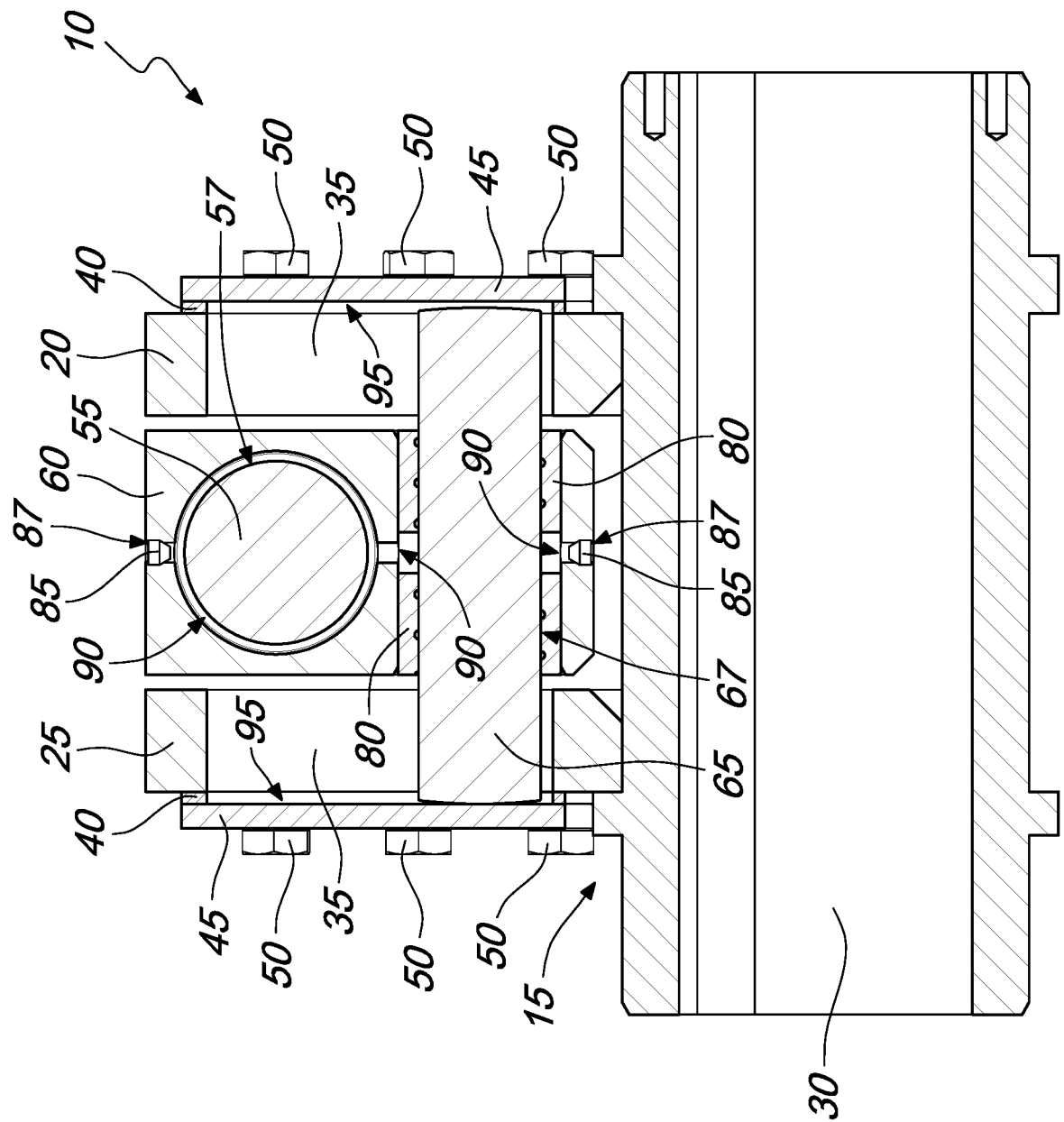
FIG. 3 is a cross-sectional front elevation view of an embodiment of the lever mechanism according to the present disclosure.
Figure 4:
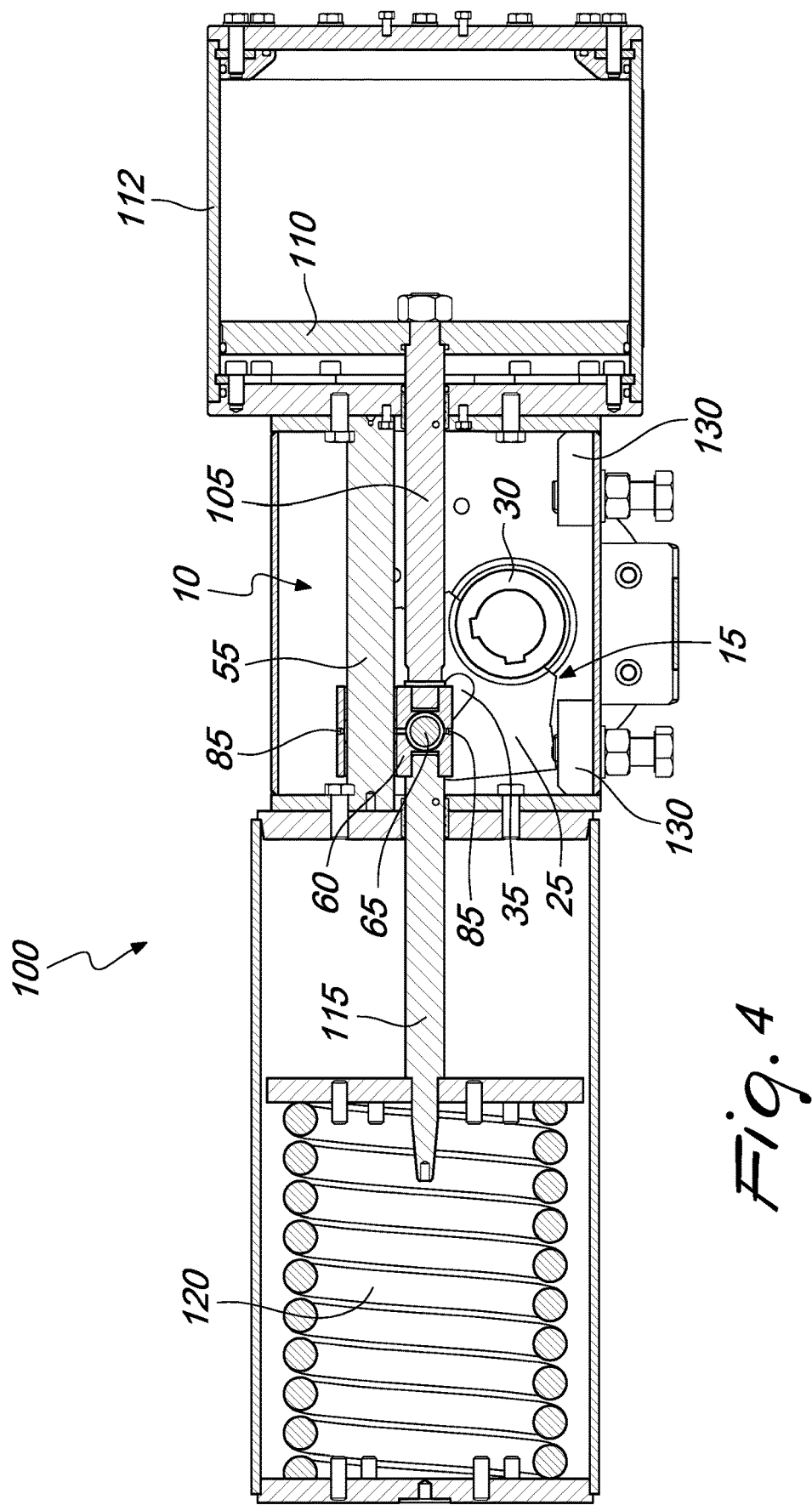
FIG. 4 is a cross-sectional side view of a single-acting pneumatic actuator provided with a return spring for the automatic return of the piston, in which an embodiment of the lever mechanism according to the present disclosure is used.

With reference to FIG. 1a-FIG. 4, the lever mechanism for converting a motion from linear to rotary according to the disclosure, which is generally designated by the reference numeral 10, substantially comprises a guiding bar 55, a slider 60 which slides along the guiding bar 55, and a lever 15, which in turn comprises a hollow cylindrical element or tube 30 and a pair of slot links 20 and 25 which are positioned one in front of the other, both fixed integrally on the tube 30 and between which the slider 60 is arranged.

The slider 60 is in essence a body, preferably made of a metallic material such as, for example, steel, which substantially has the shape of a parallelepiped rectangle, inside which are provided, by way of conventional machining techniques, holes which allow the placement of components which are necessary for the correct operation of the kinematic mechanism; such holes and components are described hereinafter.

In the upper part of the slider 60 there is a hole 57 which passes through it longitudinally from one side to the other and in such hole 57 the guiding bar 55 is positioned, which is fixed and along which the slider 60 slides.

The guiding bar 55, which is also preferably made of a metallic material such as, for example, steel, is in essence a straight cylindrical element with a smooth surface, and its function is to restrict the movement of the slider 60, forcing it to follow the direction defined by the axis of the guiding bar 55 and exclusively allowing it an alternating linear movement, i.e. toward one or the other of the ends of the guiding bar 55.

At the hole 57, on the inner surface of the slider 60 which is in contact with the guiding bar 55, there are bushes 75 for supporting the guiding bar 55, being preferably grooved bushes i.e. with helical lubrication channels on the inner sliding surface.

The bushes 75 arranged inside the slider 60 are mutually separated by a space 90 which is adapted to accommodate advantageously a reserve of lubricant, which is useful for limiting friction and thus reduces wear from sliding between the bushes 75 and the guiding bar 55, by being spread over the surfaces affected by the sliding thanks to the movement of the lever mechanism 10, in particular thanks to the sliding of the slider 60 on the guiding bar 55.

In the lower part of the slider 60, on the other hand, there is a further hole 67 which passes through it transversely from one side to the other, and in such hole a pivot 65 is arranged, which is free to rotate inside the hole 67, but which is laterally blocked thanks to an adapted containment system, which will be described hereinafter.

The pivot 65, which is also preferably made of a metallic material such as, for example, steel, has a greater width with respect to the width of the slider 60 and, in essence, protrudes from both sides of the slider 60, effectively creating two protrusions which make it possible to obtain a variable connection between two mechanical elements of a kinematic chain, one integral with the pivot 65, i.e. the slider 60, and the other integral with the slot links 20 and 25, i.e. the tube 30 of the lever 15.

At the hole 67, on the inner surface of the slider 60 which is in contact with the pivot 65, there are bushes 80 for supporting the pivot 65, being preferably grooved bushes i.e. with helical lubrication channels on the inner sliding surface.

Like the bushes 75, the bushes 80 arranged inside the slider 60 are also mutually separated by the space 90 which is adapted to accommodate advantageously a reserve of lubricant, which is useful for limiting friction and thus reduces wear from sliding between the bushes 80 and the pivot 65, by being spread over the surfaces affected by the sliding thanks to the movement of the lever mechanism 10, in particular thanks to the rotation of the pivot 65.

In the embodiment of the lever mechanism 10 described herein, inside the slider 60 there is a single space 90 which is adapted to accommodate a reserve of lubricant, but such solution does not exclude, in a different embodiment of the disclosure, providing inside the slider 60 more than one space adapted to accommodate a reserve of lubricant, for example, a first space dedicated to the pivot 65 between the bushes 80 and a second space dedicated to the guiding bar 55 between the bushes 75.

In the lower part of the slider 60 there are also longitudinal holes 70, preferably a pair, mutually opposite and with a depth that is such as to not interfere with the hole 67 and with the pivot 65, which constitute the seats for connecting the slider 60 to means for transmitting linear motion, such as, for example, stems 105 and 115 which are adapted to transmit to the slider 60 a linear motion generated by a pneumatic piston 110 or by a return spring 120.

In an embodiment the seats 70 can be internally threaded, thus constituting the female thread for screwing, and thus connecting to the slider 60, the means for transmitting linear motion described above.

In an embodiment, the slider 60 of the lever mechanism 10 according to the disclosure can also have more than two seats 70 or only one seat 70, which can be internally threaded or not.

The slider 60 finally includes holes 87, preferably one positioned on the upper face and one on the lower face, which give access from outside to the spaces 90 inside the slider 60 between the bushes 75 and between the bushes 80, such spaces 90 containing, as mentioned, a quantity of lubricant. The holes 87 are thus advantageously useful for performing the substitution or the topping-up of the lubricant.

The opening and closing of the holes 87 can be controlled from outside by way of screws 85, one for each one of the holes 87, the screws 85 being preferably hex head screws.

The lever 15, as mentioned, comprises a first slot link 20 which is arranged frontally with respect to a second slot link 25, both fixed integrally to a hollow cylindrical element or tube 30 and between which the slider 60 is arranged, all three elements 20, 25 and 30 being made preferably from a metallic material such as, for example, steel.

Each one of the slot links 20 and 25 is in essence a straight or curved bar, provided internally with a guiding slot 35 in which is accommodated the pivot 65 of the slider 60 which moves with an alternating motion, which makes it possible to provide a variable connection between two mechanical elements of a kinematic chain, one integral with the slot links 20 and 25, i.e. the tube 30 of the lever 15, the other integral with the pivot 65, i.e. the slider 60.

In detail, the first slot link 20 has a shape in which the right side and the left side are mutually parallel, while the second slot link 25 has a more unusual shape, in which the right side and the left side are inclined outwardly, for example, by an angle equal to about 45°. This particular shape structure of the second slot link 25 makes it possible to adjust the travel of the rotation of the lever 15, which stops when one of the inclined sides of the second slot link 25 strikes against an adapted stroke limiting block 130.

In a possible embodiment, the second slot link 25 can have the two sides inclined outwardly by two mutually different angles, or the slot links 20 and 25 can both have the same shape, such shape being with parallel sides or with sides inclined outwardly by a certain angle.

Both of the slot links 20 and 25 have a containment system, which in particular is adapted to lock the lateral movements of the pivot 65 of the slider 60; on both of the slot links 20 and 25 there are two plates, i.e. a spacer 40 and a cover 45, which have mutually different shapes and functions.

The spacer 40 and the cover 45 are both arranged, in this order, on the outer face of the slot link 20 or 25, both being fixed to the corresponding slot link by way of a series of screws 50.

The spacer 40 has a flat surface and is provided internally, in addition obviously to the holes necessary for the screws 50, with a slot of different shape and of greater size than the guiding slot 35 of the slot links 20 and 25 of the lever 15.

Once the spacer 40 has been installed, the cover 45 is positioned on it, the latter having, except obviously for the holes necessary for the screws 50, a flat and continuous surface.

By way of the combination between the spacer 40 and the cover 45, in the slot of the spacer 40 of each slot link 20 or 25 a space 95 is formed which is adapted to accommodate advantageously a reserve of lubricant, which is useful for limiting friction and thus reduces wear from sliding between the cover 45 and the pivot 65 of the slider 60.

The hollow cylindrical element or tube 30 in essence constitutes the element of the lever mechanism 10 which is adapted to accommodate internally, i.e. in its cavity, an element or a part of the element which is to be actuated by way of the lever mechanism 10, by coupling it to the movement of the tube 30.

In a different embodiment, the tube 30 can also be substituted by a more generic equivalent cylindrical element, not necessarily hollow, but still capable of coupling its movement to an element or a part of the element which is to be actuated by way of the lever mechanism 10.

Operation of the lever mechanism 10 according to the present disclosure, for example, if the latter is used in a single-acting pneumatically-actuated actuator 100 provided with a return spring 120 for the automatic return of the piston 110, is the following.

For the purpose of placing the pneumatic actuator 100 in motion, a quantity of air is introduced into the cylinder 112, such quantity being sufficient to actuate, thanks to the exerted pressure, the piston 110, to which a stem 105 is fixed. The linear motion generated by the pneumatic piston 110 is thus transmitted to the slider 60 by the stem 105, with the latter, which is connected to the slider 60, being inserted in a seat 70 comprised therein.

By way of the thrust received from the stem 105, the slider 60 slides along the guiding bar 55 and entrains with it the pivot 65, which, acting on the guiding slots 35 of the slot links 20 and 25 of the lever 15, causes a rotation of the lever 15, for example, by an angle equal to 90°±5°, about the axis of the tube 30, the latter being coupled to the body of the pneumatic actuator 100.

The travel of the rotation of the lever 15 stops when one of the inclined sides of the second slot link 25 strikes against one of the stroke limiting blocks 130 which are included in the body of the pneumatic actuator 100.

As a consequence of the outward stroke described above of the slider 60, furthermore, the return spring 120, which is fixed to a stem 115 connected to the slider 60, being inserted in a seat 70 comprised therein, is compressed.

When it is desired to return the pneumatic actuator 100 to its initial state, or rest state, and begin the movement to return the slider 60, the air that was previously introduced into the cylinder 112 is released and the return spring 120 can return to its natural shape. The linear motion generated by the return spring 120 is thus transmitted to the slider 60 by the stem 115.

By way of the thrust received from the stem 115, the slider 60 slides along the guiding bar 55 in the opposite direction with respect to the direction of the outward stroke and entrains with it the pivot 65, which, acting again on the guiding slots 35 of the slot links 20 and 25 of the lever 15, causes a rotation of the lever 15, for example, by an angle equal to 90°±5°, in the opposite direction with respect to the previous direction of rotation.

In synthesis, the alternating linear movement in the two directions, generated by the piston pneumatic 110 or by the return spring 120, is transmitted by the stems 105 and 115 to the slider 60, which slides along the guiding bar 55 and entrains with it the pivot 65, which, acting on the guiding slots 35 of the slot links 20 and 25 of the lever 15, causes a rotation of the lever 15 about the axis of the tube 30 which follows the direction defined by a circular arc having, for example, an angle of amplitude equal to 90°±5°.

Note that the operation of the lever mechanism 10 according to the present disclosure is the same even if the kinematic mechanism 10 is used in a double-acting pneumatically-actuated actuator, i.e. without a return spring 120.

Note furthermore that, in further embodiments of the lever mechanism 10, the angle of amplitude of the circular arc that defines the direction of rotation of the lever 15 can vary according to the requirements and to the work that the lever mechanism 10 is to perform.

In practice it has been found that the disclosure fully achieves the set aims and advantages. In particular, it has been seen that the lever mechanism for converting a motion from linear to rotary, thus conceived, makes it possible to overcome the qualitative limitations of the known art, in that it makes it possible to reduce the friction and wear from sliding which usually afflict the mechanical elements of conventional lever mechanisms, and makes it possible to internally store and retain a sufficient reserve of lubricant to ensure an adequate and lasting lubrication of those mechanical elements, thus reducing the frequency of maintenance operations.

Although the lever mechanism according to the disclosure has been devised in particular for converting a motion from linear to rotary, it can also be used, more generally, for the transmission of motion in a complex machine.

The disclosure, thus conceived, is susceptible of numerous modifications and variations, all of which are within the scope of the appended claims; by way of non-limiting example, the person skilled in the art will understand without effort that a safety mechanism can be provided which is capable of stopping the movement of the lever mechanism 10, for example, in order to allow the maintenance operations, or that the guiding bar 55 can have a diameter that can vary according to requirements and to the work that the lever mechanism 10 is to perform. Moreover, all the details may be substituted by other, technically equivalent elements.

In practice the materials employed, and the contingent dimensions and shapes, may be any according to requirements and to the state of the art.

The invention claimed is:

1. A lever mechanism for converting a motion from linear to rotary, comprising a guiding bar, a slider which slides along said guiding bar, and a lever, said lever comprising a cylindrical element and a pair of slot links which are fixed frontally on said cylindrical element and between which said slider is arranged, wherein said slider comprises at least two bushes for supporting a pivot which is adapted to act on said slot links, said at least two bushes being mutually separated by a first space which is adapted to accommodate a reserve of lubricant, said space being defined around said pivot, said pivot being arranged orthogonal to said guiding bar.

2. The lever mechanism according to claim 1, wherein said slider comprises at least two bushes for supporting said guiding bar, said at least two bushes being mutually separated by a second space adapted to accommodate a reserve of lubricant.

3. The lever mechanism according to claim 2, wherein said bushes have helical lubrication channels on an inner sliding surface.

4. The lever mechanism according to claim 1, wherein at least one of said slot links comprises a spacer and a cover, defining a second space which is adapted to accommodate a reserve of lubricant.

5. The lever mechanism according to claim 1, wherein said slider comprises at least one seat which is adapted to connect said slider to means for transmitting linear motion.

6. The lever mechanism according to claim 5, wherein said at least one seat is internally threaded.

7. The lever mechanism according to claim 1, wherein said slider comprises at least one hole which is adapted to provide access to said first space adapted to accommodate a reserve of lubricant.

8. The lever mechanism according to claim 7, wherein the opening and closing of said at least one hole is controlled by way of a screw.

9. The lever mechanism according to claim 8, wherein said screw is a hex head screw.

10. The lever mechanism according to claim 1, wherein at least one of said slot links has at least one side that is inclined outwardly and is adapted to adjust the stroke of the rotation of said lever by striking against a stroke limiting block.

* * * * *